United States Patent
Deng et al.

(10) Patent No.: US 12,426,018 B2
(45) Date of Patent: Sep. 23, 2025

(54) CONFIGURATION METHOD AND APPARATUS, DATA PROCESSING METHOD AND APPARATUS, DEVICE, AND STORAGE MEDIUM

(71) Applicant: ZTE CORPORATION, Shenzhen (CN)

(72) Inventors: Yiwei Deng, Shenzhen (CN); Peng Hao, Shenzhen (CN); Jian Li, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 614 days.

(21) Appl. No.: 17/793,619

(22) PCT Filed: Jan. 15, 2021

(86) PCT No.: PCT/CN2021/072235
§ 371 (c)(1),
(2) Date: Jul. 18, 2022

(87) PCT Pub. No.: WO2021/143871
PCT Pub. Date: Jul. 22, 2021

(65) Prior Publication Data
US 2023/0108892 A1    Apr. 6, 2023

(30) Foreign Application Priority Data
Jan. 17, 2020   (CN) .......................... 202010055041.6

(51) Int. Cl.
*H04W 72/0446* (2023.01)
*H04B 1/707* (2011.01)
*H04L 1/18* (2023.01)

(52) U.S. Cl.
CPC ........ *H04W 72/0446* (2013.01); *H04B 1/707* (2013.01); *H04L 1/18* (2013.01)

(58) Field of Classification Search
CPC .......... H04W 72/0446; H04W 72/0453; H04B 1/707; H04B 2201/709709; H04B 1/7103;
(Continued)

(56) References Cited

U.S. PATENT DOCUMENTS 10,965,503 B2 *   3/2021   Liu .................... H04L 25/03866
11,013,030 B2 *   5/2021   Zhang ................. H04L 27/2613
(Continued)

FOREIGN PATENT DOCUMENTS

CN   101005313 A   7/2007
CN   101132626 A   2/2008
(Continued)

OTHER PUBLICATIONS

Supplementary European Search Report for Application No. 21740754.3, dated Jan. 24, 2024, 12 pages.
(Continued)

*Primary Examiner* — Brian T O Connor
(74) *Attorney, Agent, or Firm* — Morgan, Lewis & Bockius LLP

(57) ABSTRACT

Provided are a configuration method and apparatus, a data processing method and apparatus, a device and a storage medium. The configuration method includes configuring a corresponding spreading code sequence for each first communication node and sending the corresponding spreading code sequence to each first communication node. The spreading code sequence is configured to be used by the first communication node to process first to-be-transmitted data or received second data.

16 Claims, 7 Drawing Sheets

(58) Field of Classification Search
CPC . H04L 1/18; H04L 1/1896; H04L 1/08; H04L 1/1819; H04L 5/0048; H04L 5/0016; H04L 5/001; H04J 13/18; H04J 2013/165; H04J 13/004
See application file for complete search history.

(56) References Cited

U.S. PATENT DOCUMENTS

| | | | | |
|---|---|---|---|---|
| 11,611,967 | B2* | 3/2023 | Wu | H04L 5/0019 |
| 11,617,198 | B2* | 3/2023 | Fakoorian | H04L 5/1469 370/329 |
| 11,658,788 | B2* | 5/2023 | Cao | H04L 5/0055 370/329 |
| 11,737,024 | B2* | 8/2023 | Sun | H04W 68/00 370/311 |
| 2018/0152271 | A1 | 5/2018 | You et al. | |
| 2019/0068424 | A1 | 2/2019 | Park et al. | |
| 2019/0260417 | A1 | 8/2019 | Park et al. | |
| 2019/0288817 | A1 | 9/2019 | Yang et al. | |
| 2023/0397112 | A1* | 12/2023 | Sun | H04W 84/04 |

FOREIGN PATENT DOCUMENTS

| | | |
|---|---|---|
| CN | 101192877 A | 6/2008 |
| CN | 101394206 A | 3/2009 |
| CN | 103227819 A | 7/2013 |
| CN | 106254025 A | 12/2016 |
| CN | 111901084 A | 11/2020 |
| WO | WO-2018166693 A1 | 9/2018 |
| WO | WO2019119433 A1 | 6/2019 |

OTHER PUBLICATIONS

Panasonic, "Multiple subframe code spreading for MTC UEs", 3GPP TSG RAN WG1 Meeting #83, R1-156950, Nov. 15, 2015, 3 pages.
CMCC, "Discussion on PUSCH repetition for grant-free transmission", 3GPP TSG RAN WG1 Meeting #92bis, R1-1804103, Apr. 16, 2018, 3 pages.
Wi Rapporteur (Huawei), "RAN1 agreements for Rel-16 eURLLC", 3GPP TSG RAN WG1 Meeting #99, R1-1913603, Nov. 18, 2019, 40 pages.
International Search Report for Application No. PCT/CN2021/072235, dated Apr. 16, 2021, 4 pages including English translation.
Qualcomm Incorporated, "Transmitter Side Signal Processing Schemes for NOMA", 3GPP TSG RAN WG1 Meeting #94bis, R1-1811648, Oct. 8-12, 2018, Chengdu, China.
Chinese Office Action for Application No. 2020100550416, dated Apr. 30, 2024, 14 pages including translation.
Chinese Search Report for Application No. 2020100550416, dated Apr. 28, 2024, 6 pages including translation.

* cited by examiner

CONFIGURATION METHOD AND APPARATUS, DATA PROCESSING METHOD AND APPARATUS, DEVICE, AND STORAGE MEDIUM

CROSS-REFERENCE TO RELATED APPLICATION(S)

This is a national stage application filed under 37 U.S.C. 371 based on International Patent Application No. PCT/CN2021/072235, filed Jan. 15, 2021, which claims priority to Chinese Patent Application No. 202010055041.6 filed with the China National Intellectual Property Administration (CNIPA) on Jan. 17, 2020, the disclosures of which are incorporated herein by reference in their entireties.

TECHNICAL FIELD

The present application relates to the field of wireless communication network technology, for example, a configuration method and apparatus, a data processing method and apparatus, a device and a storage medium.

BACKGROUND

In the fifth-generation mobile communication technology (5G), to ensure coverage and improve service transmission reliability, a communication node may use at least one slot to repeatedly send the redundancy version (RV) of the same transport block (TB). In Release 17 (R-17), it is urgent to solve the problem of how an outdoor first communication node is used to cover indoor user equipment (UE) having a high rate.

SUMMARY

The present application provides a configuration method and apparatus, a data processing method and apparatus, a device and a storage medium.

In a first aspect, an embodiment of the present application provides a configuration method. The method is applied to a second communication node. The method includes the following: A corresponding spreading code sequence is configured for each first communication node; and the corresponding spreading code sequence is sent to each first communication node, and the spreading code sequence is configured to be used by the first communication node to process first to-be-transmitted data or received second data.

In a second aspect, an embodiment of the present application provides a data processing method. The method is applied to the first communication node. The method includes the following: The spreading code sequence sent by the second communication node is received, and the spreading code sequence is configured and sent by the second communication node; and the first to-be-transmitted data or the received second data are processed based on the spreading code sequence, and the second data is obtained from second to-be-transmitted data processed by the second communication node.

In a third aspect, an embodiment of the present application provides a configuration apparatus. The apparatus includes a configuration module and a first sending module.

The configuration module is configured to configure the corresponding spreading code sequence for each first communication node.

The first sending module is configured to send the corresponding spreading code sequence to each first communication node. The spreading code sequence is configured to be used by the first communication node to process the first to-be-transmitted data or the received second data.

In a fourth aspect, an embodiment of the present application provides a data processing apparatus. The apparatus includes a second receiving module and a first processing module.

The second receiving module is configured to receive the spreading code sequence sent by the second communication node. The spreading code sequence is configured and sent by the second communication node.

The first processing module is configured to process the first to-be-transmitted data or the received second data based on the spreading code sequence. The second data is obtained from second to-be-transmitted data processed by the second communication node.

In a fifth aspect, an embodiment of the present application provides a device. The device includes at least one processor and a memory.

The memory is configured to store at least one program.

When executed by the at least one processor, the at least one program causes the at least one processor to perform any method according to embodiments of the present application.

In a sixth aspect, an embodiment of the present application provides a storage medium. The storage medium stores a computer program which, when executed by a processor, causes the processor to perform any method according to the embodiments of the present application.

DETAILED DESCRIPTION

Embodiments of the present application are described hereinafter in detail in conjunction with drawings. It is to be noted that if not in collision, embodiments of the present application and features therein may be combined with each other in any manner.

The procedures illustrated in the flowcharts among the drawings may be performed by, for example, a computer system capable of executing a set of computer-executable instructions. Moreover, although logical sequences are illustrated in the flowcharts, the procedures illustrated or described may be performed in sequences different from those described here in some cases.

The technical solutions of the present application may be applied to various communication systems such as the Global System for Mobile Communications (GSM), the code-division multiple access (CDMA) system, the wideband code-division multiple access (WCDMA) system, General Packet Radio Service (GPRS), the Long Term Evolution (LTE) system, the Long Term Evolution-Advanced (LTE-A) system, the Universal Mobile Telecommunications System (UMTS) and the 5G system, and the embodiments of the present application are not limited. In the present application, description is given by using an example of the 5G system.

Figure 1:
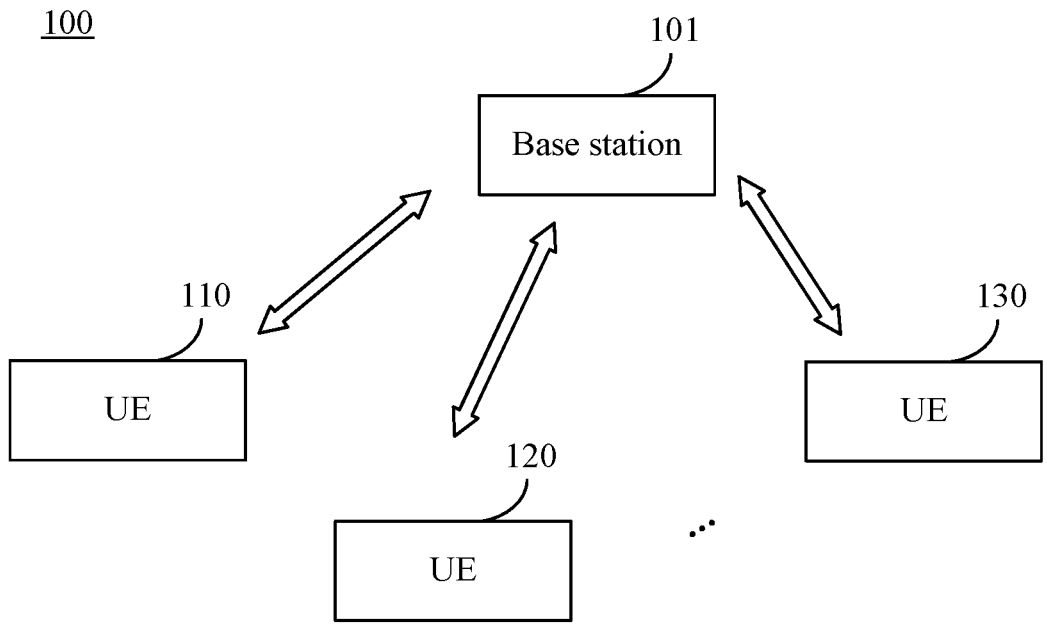
FIG. 1 is a diagram illustrating the structure of a wireless network system according to the present application.

The embodiments of the present application may be applied to wireless networks of different standards. Wireless access networks may include different communication nodes in different systems. FIG. 1 is a diagram illustrating the structure of a wireless network system according to the present application. As shown in FIG. 1, this wireless network system 100 includes a base station 101, user equipment 110, user equipment 120 and user equipment 130. The base station 101 performs wireless communication with the user equipment 110, the user equipment 120 and the user equipment 130 separately.

First, it is to be noted that in the embodiments of the present application, the base station may be a device capable of communicating with a user terminal. The base station may be any device having a wireless receiving-sending function and includes, but is not limited to, a base station (NodeB), an evolved base station (eNodeB), a base station in the 5G communication system, a base station in a future communication system, an access node in a Wireless Fidelity (Wi-Fi) system, a wireless relay node and a wireless backhaul node. The base station may also be a radio controller in a cloud radio access network (C-RAN) scenario. The base station may also be, for example, a Small Cell or a transmission node (transmission reference point (TRP)). The embodiments of the present application are not limited.

In the embodiments of the present application, the user terminal is a device having a wireless receiving-sending function. The device may be deployed on land including indoors, outdoors, handled, wearable or vehicle-mounted; may be deployed on water (for example, on a ship); or may be deployed in the air (for example, one an airplane, balloon or satellite). The user terminal may be a mobile phone, a portable android device (PAD), a computer having a wireless receiving-sending function, a virtual reality (VR) terminal, an augmented reality (AR) terminal, a wireless terminal in industrial control, a wireless terminal in self-driving, a wireless terminal in telemedicine, a wireless terminal in a smart grid, a wireless terminal in transportation safety, a wireless terminal in a smart city and a wireless terminal in smart home. Application scenarios are not limited in the embodiments of the present application. The user terminal may also sometimes be referred to as a terminal, an access terminal, a UE unit, a UE station, a mobile station, a mobile platform, a remote station, a remote terminal, a mobile device, a UE terminal, a wireless communication device, a UE agent or a UE apparatus. The embodiments of the present application are not limited.

In the 5G system, to ensure a coverage area and improve service transmission reliability, a communication node may use at least one slot to repeatedly send the same transport block, and the same transport block may have the same or different redundancy versions (RVs). In R-17, it is urgent to solve the scenario of how an outdoor base station is used to cover indoor user equipment having a high rate.

In the scenario where an outdoor base station covers indoor user equipment, a penetration loss causes poor coverage and poor channel conditions of some user equipments. To solve the preceding problems, repeated transmission mechanisms in 5G New Radio (NR) R-15 and R-16 are generally used for coverage enhancement. In an actual scenario, the density of indoor user equipment is great, and a neighborhood configures multiple scheduling-free repeated transmissions for multiple user equipments to perform a data transmission or schedules multiple aggregation transmissions to perform the data transmission. In R-16, the maximum number of transmission repetitions of a physical uplink shared channel (PUSCH) is 16. During multiple repeated transmission processes, time-frequency resources used by different UE may overlap. When the time-frequency resources used by different UE overlap, the interference between the data sent on the overlapping resources is great, and the service transmission reliability is severely affected.

Figure 2:
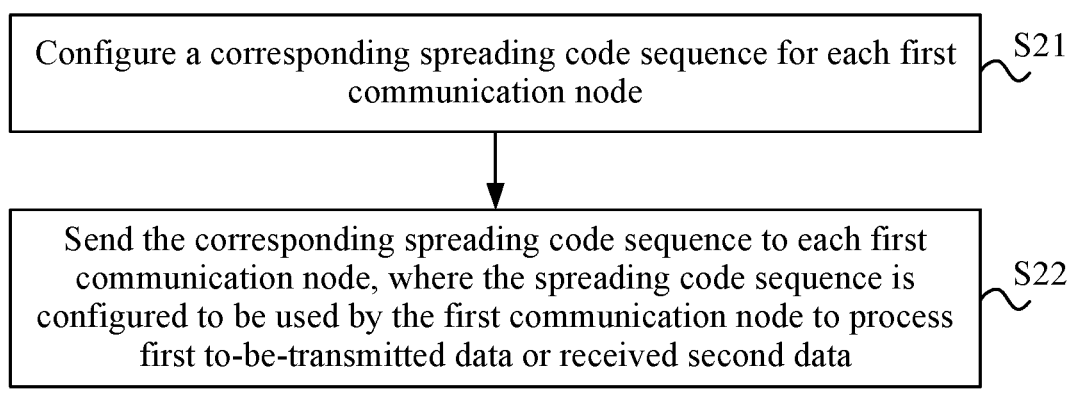
FIG. 2 is a flowchart of a configuration method according to the present application.

FIG. 2 is a flowchart of a configuration method according to the present application. This method may be applied to the case where a base station configures a spreading code for UE and indicates the spreading code to the UE. This method may be executed by a configuration apparatus provided by the present application. The method is applied to a second communication node. The configuration apparatus may be performed by software and/or hardware and integrated on the second communication node.

As shown in FIG. 2, the configuration method provided by an embodiment of the present application mainly includes S21 and S22.

In S21, a corresponding spreading code sequence is configured for each first communication node.

In S22, the corresponding spreading code sequence is sent to each first communication node. The spreading code sequence is configured to be used by the first communication node to process first to-be-transmitted data or received second data.

In this embodiment of the present application, the first communication node may be understood as user equipment. The user equipment may be any of the preceding user equipment. The second communication node may be understood as a base station. The base station may be any of the preceding base stations. In this embodiment of the present application, description is given by using an example of the 5G base station. The second communication node may communicate with multiple first communication nodes.

In this embodiment, the first to-be-transmitted data of the first communication node may be the uplink data to be sent by the user terminal to the base station.

The spreading code sequence is configured to instruct the user equipment to spread a spectrum to reduce or eliminate the interference between data during a repeated transmission process and enhance coverage. For example, the spreading code sequence may be (1, 1, 1, 1). For another example, the spreading code sequence may also be (1, −1, 1, −1). This is not limited in this embodiment of the present application.

In this embodiment, a different spreading code sequence is configured for each user equipment communicating with the base station, and the spreading code sequence configured for the user equipment is sent to corresponding user equipment.

In an exemplary embodiment, the corresponding spreading code sequence is configured in the following manner: A spreading code sequence and a time domain resource allocation (TDRA) table are jointly encoded.

The time domain resource allocation (TDRA) table is used to indicate which uplink time domain the UE uses to receive a PUSCH.

In an exemplary embodiment, the spreading code sequence and the time domain resource allocation (TDRA) table are jointly encoded in one of the following manners: A corresponding spreading code sequence is configured in the TDRA table; or a spreading code sequence table is configured, index information is configured in the TDRA table, and the index information is configured to indicate a corresponding spreading code sequence in the spreading code sequence table.

In this embodiment, the configuration of the corresponding spreading code sequence in the TDRA table means that a new column of data is added in the TDRA table to directly indicate the spreading code sequence corresponding to a row index in different TDRA tables.

In this embodiment, the base station configures a spreading code sequence table for the UE, and then a new column of data is added in the TDRA table to indicate the spreading code sequence index corresponding to a row index in the TDRA table. The spreading code sequence table includes a row index and the spreading code sequence corresponding to the row index. A spreading code sequence index is used to indicate a corresponding spreading code sequence in the spreading code sequence table. Different row indexes correspond to different spreading code sequences.

In an exemplary embodiment, the corresponding spreading code sequence is configured in one of the following manners: A new spreading code indication signaling is configured, and the new spreading code indication signaling indicates the corresponding spreading code sequence; a new spreading code indication field is configured in the current signaling, and the new spreading code indication field indicates the corresponding spreading code sequence; a spreading code sequence table and a corresponding spreading code indication signaling are configured, the corresponding spreading code indication signaling includes indication information, and the indication information is configured to indicate the index of the corresponding spreading code sequence in the spreading code sequence table; or the spreading code sequence table is configured, a corresponding spreading code indication field in the current signaling is configured, the corresponding spreading code indication field includes indication information, and the indication information is configured to indicate the index of the corresponding spreading code sequence in the spreading code sequence table.

In an exemplary embodiment, the method also includes the following: The correspondence between the length of the spreading code sequence and different elements in a redundancy version (RV) sequence is configured; and the correspondence between spreading code sequences of different first communication nodes and a plurality of identical elements in the RV sequence is configured.

In this embodiment, the length of an actually configured spreading code sequence is greater than or equal to twice the number of different elements in the RV sequence.

Further, there is an orthogonal relationship between the same multiple RVs and the spreading code sequences corresponding to multiple UE.

In an exemplary embodiment, the method also includes the following: A delay signaling is configured, and the delay signaling is configured to indicate the delay of a nominal repeated transmission and the start position of the delayed transmission resource in response to a subframe boundary or a U/D switching point occurring in a nominal repeated transmission resource of a first communication node.

In an exemplary embodiment, the spreading code sequence is also configured to indicate the first communication node to delay the position of the nominal repeated transmission to the nearest transmissible resource of the nominal repeated transmission in response to the subframe boundary or the U/D switching point occurring in the nominal repeated transmission resource. The position of the nearest transmissible resource is not allowed to exceed a pre-configured time window.

In this embodiment, an actual transmission occasion is implicitly indicated by whether the spreading code table is configured or whether a spreading code sequence is configured in the TDRA table. If a spreading code sequence is configured, when a nominal repeated transmission resource encounters a subframe boundary or a U/D switching point, this nominal repeated transmission is not divided, and this nominal repeated transmission is delayed to the nearest available time-frequency resource for transmission. The delayed position is not allowed to exceed one preset time window. The time window may be determined according to a service delay, that is, the delayed position is not allowed to exceed one service delay. Accordingly, the spreading code sequence corresponding to this nominal repeated transmission is unchanged. If no spreading code sequence is configured, the transmission of a transmission mechanism is performed according to the mechanism of R-16. One nominal repeated transmission resource TO is divided into more than one actual transmission occasion (TO).

In an exemplary embodiment, the method also includes the following: Second to-be-transmitted data is processed based on the spreading code sequence to obtain the second data; and the second data is sent to the first communication node.

The second to-be-transmitted data may be understood as the downlink data to be transmitted by the base station to the user terminal.

In an exemplary embodiment, the method also includes the following: First data sent by the first communication node is received, and the first data is obtained from the first to-be-transmitted data processed by the first communication node; and in response to a repeated transmission occurring between a plurality of first communication nodes, the first data is processed based on the spreading code sequence.

The first data may be understood as the uplink data sent by the user terminal to the base station.

In this embodiment, the first data received by the second communication node is mixed data of multiple first communication nodes. The mixed data received and the spreading code sequence of each first communication node are computed to obtain the uplink data corresponding to each first communication node.

Further, in response to the length of a spreading code sequence being greater than the number of transmission repetitions, first N bits of the spreading code sequence are intercepted and are used as the corresponding spreading code sequence. N denotes the number of transmission repetitions.

Further, in response to the length of a spreading code sequence being less than the number of transmission repetitions, a polling extension is performed on the spreading code sequence, and first N bits of a spreading code sequence obtained by the polling extension are intercepted and are used as the corresponding spreading code sequence. N denotes the number of transmission repetitions.

Figure 3:
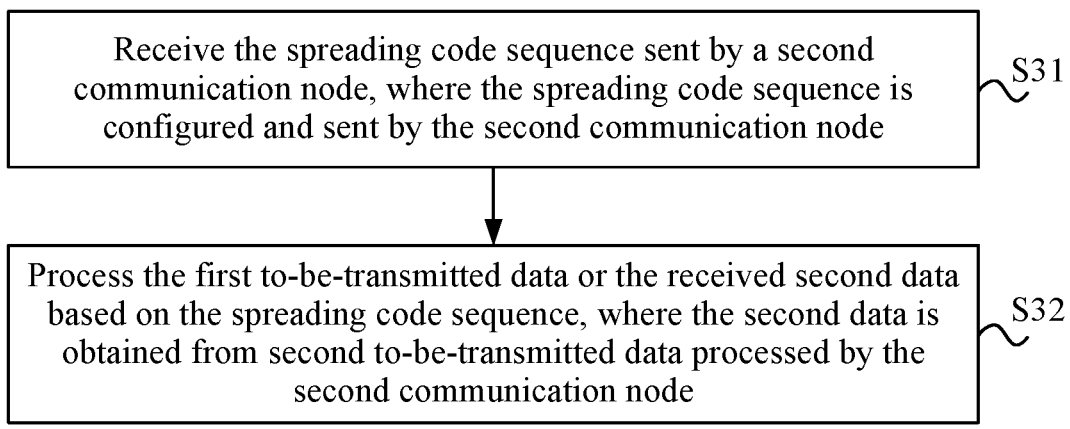
FIG. 3 is a flowchart of a data processing method according to the present application.

FIG. 3 is a flowchart of a data processing method according to the present application. This method may be applied to the case where the UE performs data processing based on the spreading code configured by the base station. This method may be executed by a data processing apparatus provided by the present application. The method is applied to the first communication node. The data processing apparatus may be performed by software and/or hardware and may be integrated on the user equipment.

As shown in FIG. 3, the data processing method provided by an embodiment of the present application mainly includes S31 and S32.

In S31, the spreading code sequence sent by the second communication node is received. The spreading code sequence is configured and sent by the second communication node.

In S32, the first to-be-transmitted data or the received second data are processed based on the spreading code sequence. The second data is obtained from second to-be-transmitted data processed by the second communication node.

In an exemplary embodiment, the spreading code sequence is configured by the second communication node in the following manner: The second communication node jointly encodes a spreading code sequence and the time domain resource allocation (TDRA) table.

In an exemplary embodiment, the second communication node jointly encodes a spreading code sequence and a time domain resource allocation (TDRA) table in one of the following manners: The second communication node configures a corresponding spreading code sequence in the TDRA table; or the second communication node configures the spreading code sequence table and configures index information in the TDRA table, and the index information is configured to indicate a corresponding spreading code sequence in the spreading code sequence table.

In an exemplary embodiment, the spreading code sequence is configured by the second communication node in one of the following manners: The second communication node configures a first spreading code indication signaling, and the first spreading code indication signaling includes the corresponding spreading code sequence; the second communication node configures a first spreading code indication field in the existing signaling, and the first spreading code indication field includes the corresponding spreading code sequence; the second communication node configures a corresponding spreading code sequence table and a corresponding second spreading code indication signaling, the second spreading code indication signaling includes indication information, and the indication information is configured to indicate a spreading code sequence in the spreading code sequence table; or the second communication node configures the spreading code sequence table and configures a second spreading code indication field in the existing signaling, the second spreading code indication field includes indication information, and the indication information is configured to indicate the corresponding spreading code sequence in the spreading code sequence table.

In an exemplary embodiment, in response to the length of a spreading code sequence being greater than the number of transmission repetitions, first N bits of the spreading code sequence are intercepted and are used as the corresponding spreading code sequence.

If the length of a configured spreading code sequence is greater than the number of transmission repetitions, the UE correspondingly intercepts the length of the spreading code sequence corresponding to the number of transmission repetitions and uses the spreading code sequence of this length as the corresponding spreading code sequence. For example, the number of repetitions configured for a row in a TDRA table is 4, and a spreading code sequence is configured as (1, 1, 1, 1, 1, 1). Then the UE correspondingly intercepts a spreading code sequence of the length of 4, that is, the spreading code sequence in the corresponding square bracket of ([1, 1, 1, 1], 1, 1).

In an exemplary embodiment, in response to the length of a spreading code sequence being less than the number of transmission repetitions, a polling extension is performed on the spreading code sequence, and first N bits of a spreading code sequence obtained by the polling extension are intercepted and are used as the corresponding spreading code sequence. N denotes the number of transmission repetitions.

Further, if the length of a configured spreading code sequence is less than the number of transmission repetitions, a polling extension is performed on the corresponding spreading code sequence. The UE correspondingly intercepts the length of a spreading code sequence obtained by the polling extension corresponding to the number of transmission repetitions and uses the spreading code sequence of this length as the corresponding spreading code sequence. For example, the number of repetitions configured for a row in a TDRA table is 6, and a spreading code sequence is configured as (1, 1, 1, 1). Then a polling extension is performed on the spreading code to generate a spreading code sequence (1, 1, 1, 1)(1, 1, 1, 1) having a length greater than the number of transmission repetitions, and the length of the spreading code sequence corresponding to the number of transmission repetitions is correspondingly intercepted and the spreading code sequence of this length is used as the corresponding spreading code sequence.

In an exemplary embodiment, the method also includes the following: A delay signaling is received, and the delay signaling is configured to indicate the delay of a nominal repeated transmission and the start position of the delayed transmission resource in response to a subframe boundary or a U/D switching point occurring in a nominal repeated transmission resource of the first communication node.

In an exemplary embodiment, the spreading code sequence is also configured to indicate that the position of the nominal repeated transmission is delayed to the nearest transmissible resource of the nominal repeated transmission in response to the subframe boundary or the U/D switching point occurring in the nominal repeated transmission resource. The position of the nearest transmissible resource is not allowed to exceed the pre-configured time window.

In an exemplary embodiment, the method also includes the following: In response to the subframe boundary or the U/D switching point occurring in the nominal repeated transmission resource, this nominal repeated transmission resource is divided into a plurality of actual transmission occasions. The RV corresponding to each actual transmission occasion is the RV corresponding to this nominal repeated transmission. Byte lengths carried by RVs respectively corresponding to plurality of actual repeated transmission occasions are the same. The byte length carried by an RV is the byte length carried by the RV corresponding to the shortest actual transmission occasion. The spreading code corresponding to the multiple actual transmission occasions is the spreading code corresponding to the same RVs configured for the spreading code of the nominal repeated transmission. The spreading code corresponding to the nominal transmission is removed from the spreading code sequence. For example, the base station configures four times of nominal repeated transmissions for the UE, T01, T02, T03 and T04, the corresponding RV is (0303), and a spreading code sequence is (1, 1, −1, −1). T02 is divided into an actual repeated transmission A01 and an actual repeated transmission A02. Then the spreading code of A01 and A02 correspond to the spreading code corresponding to RV3 in a nominal repeated transmission: (1, −1). Actually, the spreading code corresponding to T01, A01, A02, T03 and T04 is (1, 1, −1, −1, −1).

In an exemplary embodiment, the method also includes the following: In response to a subframe boundary in a nominal repeated transmission resource, this nominal repeated transmission resource is divided into a plurality of actual transmission occasions. The RV corresponding to each actual transmission occasion is the same as the RV corresponding to this nominal repeated transmission. Bytes of multiple actual transmission occasions are the bytes corresponding to this nominal repeated transmission resource sequentially intercepted. For example, the number of bits of this nominal repeated transmission is 100 bits. This nominal repeated transmission is divided into two actual transmission occasions. The first actual transmission occasion carries the first 40 bits of the 100 bits in this nominal repeated transmission, and the second actual transmission occasion carries the last 60 bits of the 100 bits in this nominal repeated transmission. The two actual repeated transmission occasions use the spreading code sequence corresponding to this nominal repeated transmission. During processing, a receiving end connects the bits transmitted by the two actual repeated transmission occasions together, and the two actual repeated transmission occasions are used as one actual repeated transmission.

In an exemplary embodiment, a data processing system is provided. The data processing system includes a first communication node and a second communication node. This embodiment of the present application provides a data interaction flow in which the user terminal of the first communication node is used as a sending end, and the base station of the second communication node is used as a receiving end.

Figure 4A:
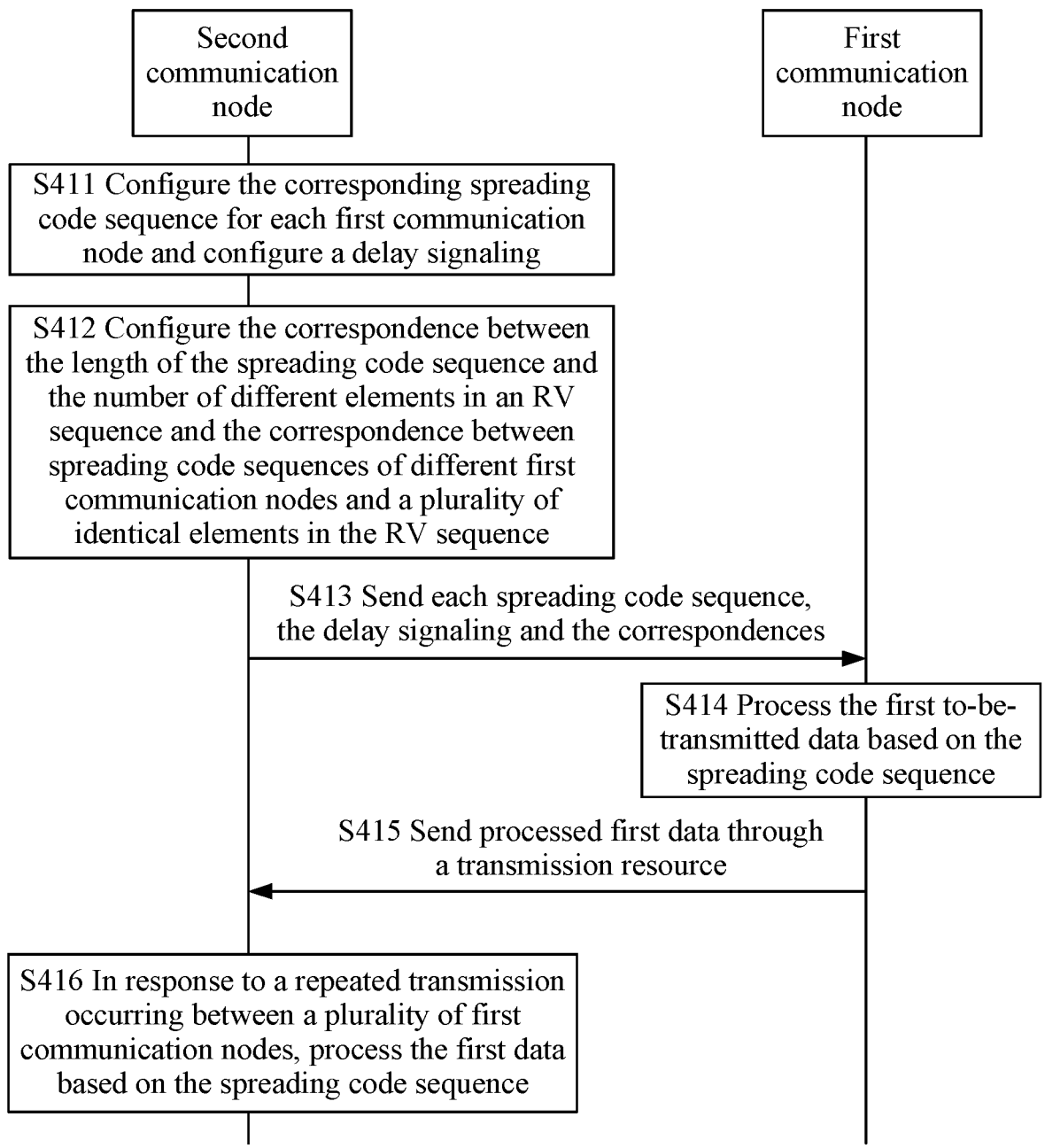
FIG. 4A is an interaction flowchart of data processing according to an embodiment of the present application.

FIG. 4A is an interaction flowchart of data processing according to an embodiment of the present application. As shown in FIG. 4A, a data processing flow provided by this embodiment of the present application mainly includes the following.

In S411, the second communication node configures a corresponding spreading code sequence for each first communication node and configures a delay signaling.

The spreading code sequence is configured to be used by the first communication node to process the first to-be-transmitted data or the received second data. The delay signaling is configured to indicate the delay of a nominal repeated transmission and the start position of the delayed transmission resource in response to a subframe boundary or a U/D switching point occurring in a nominal repeated transmission resource of the first communication node.

In S412, the second communication node configures the correspondence between the length of the spreading code sequence and the number of different elements in a redundancy version (RV) sequence and the correspondence between spreading code sequences of different first communication nodes and a plurality of identical elements in the RV sequence.

In S413, the second communication node sends each spreading code sequence, the delay signaling and the correspondences to a corresponding first communication node.

The spreading code sequence is configured to be used by the first communication node to process the first to-be-transmitted data.

In S414, the first communication node processes the first to-be-transmitted data based on the spreading code sequence to obtain the first data.

In S415, the first communication node sends the processed first data to the second communication node through a transmission resource.

In S416, in response to a repeated transmission occurring between a plurality of first communication nodes, the second communication node processes the first data based on the spreading code sequence.

It is to be noted that only the interaction flow between the first communication node and the second communication node is described in this embodiment. The detailed configuration method and data processing method thereof may refer to the description in any embodiment of the present application, and details are not repeated in this embodiment.

In an exemplary embodiment, a data processing system is provided. The data processing system includes a first communication node and a second communication node. This embodiment of the present application provides a data interaction flow in which the user terminal of the first communication node is used as a receiving end, and the base station of the second communication node is used as a sending end.

Figure 4B:
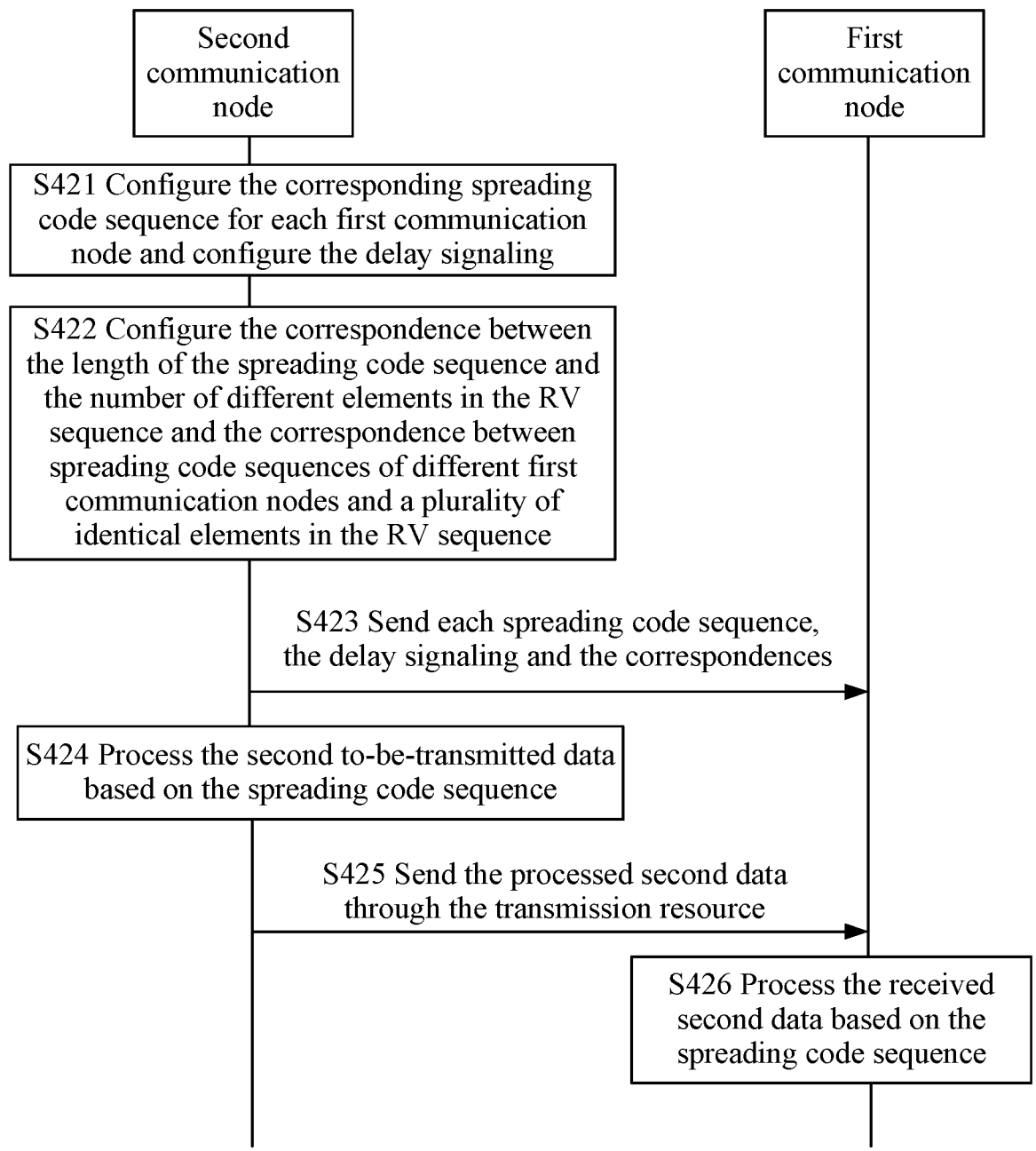
FIG. 4B is an interaction flowchart of data processing according to an embodiment of the present application.

FIG. 4B is an interaction flowchart of data processing according to an embodiment of the present application. As shown in FIG. 4B, a data processing flow provided by this embodiment of the present application mainly includes the following.

In S421, the second communication node configures a corresponding spreading code sequence for each first communication node and configures a delay signaling.

The spreading code sequence is configured to be used by the first communication node to process the first to-be-transmitted data or the received second data. The delay signaling is configured to indicate the delay of a nominal repeated transmission and the start position of the delayed transmission resource in response to a subframe boundary or a U/D switching point occurring in a nominal repeated transmission resource of the first communication node.

In S422, the second communication node configures the correspondence between the length of the spreading code sequence and the number of different elements in a redundancy version (RV) sequence and the correspondence between spreading code sequences of different first communication nodes and a plurality of identical elements in the RV sequence.

In S423, the second communication node sends each spreading code sequence, the delay signaling and the correspondences to a corresponding first communication node.

The spreading code sequence is configured to be used by the first communication node to process the received second data.

In S424, the second communication node processes the second to-be-transmitted data based on the spreading code sequence to obtain the second data.

In S425, the second communication node sends the processed second data to the first communication node through a transmission resource.

In S426, the first communication node processes the received second data based on the spreading code sequence.

It is to be noted that only the interaction flow between the first communication node and the second communication node is described in this embodiment. The detailed configuration method and the data processing method thereof may refer to the description in any embodiment of the present application, and details are not repeated in this embodiment.

In an application embodiment, a solution in which the base station configures a spreading code sequence and processes received data is provided.

In the scenario where an outdoor base station covers indoor user equipment having a high rate, the repeated transmission mechanism in the current R-16 or R-15 may be multiplexed so that coverage enhancement is performed. In a neighborhood, multiple repeated transmissions are configured for multiple user equipments. Since the multiple repeated transmissions are affected by the size of a time-frequency resource or spectrum usage efficiency, time-frequency resources configured by different UE may overlap. To avoid that the interference caused by the overlapping of the time-frequency resources of different UE affects a coverage performance, in the related art, the first communication node configures a spreading code for different UE, and when some time-frequency resources overlap or all time-frequency resources overlap during the multiple repeated transmissions of multiple UE, the overlaps of time-frequency resources are processed. A sending end may multiply sending data by a corresponding spreading code and then send data to a receiving end. The receiving end may use a corresponding spreading code sequence configured for the receiving end to perform corresponding processing (being multiplied by the corresponding spreading code) on the received data. Thus, the interference caused by the first communication node due to the overlapping of time-frequency resources is eliminated, and a coverage capability is enhanced.

Figure 5A:
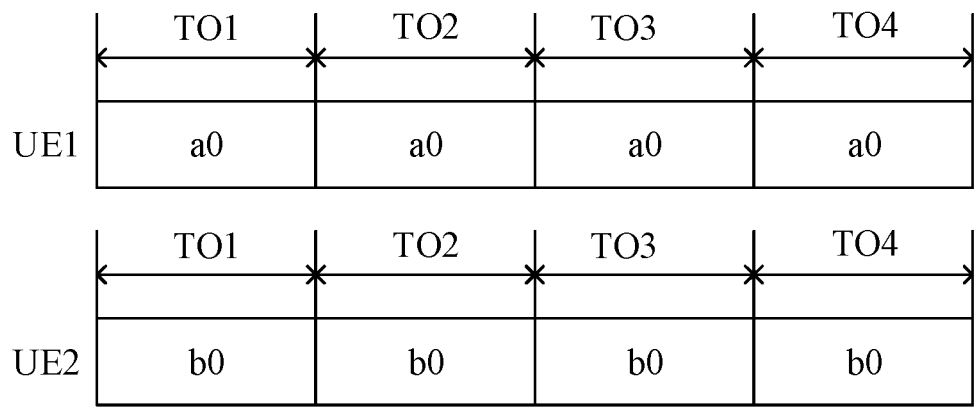
FIG. 5A is a diagram illustrating that PUSCH time-frequency resources of two user equipments overlap according to an embodiment of the present application.

FIG. 5A is a diagram illustrating that PUSCH time-frequency resources of two user equipments overlap according to an embodiment of the present application. As shown in FIG. 5A, in a neighborhood, UE 1 and UE 2 use the same time-frequency resource to perform PUSCH repeated transmissions, and both UE 1 and UE 2 perform PUSCH repeated transmissions 4 times. The RV sequence used in UE 1 and UE 2 is (0, 0, 0, 0). Each TO transmission information of UE 1 is a0, and each TO transmission information of UE 2 is b0. The spreading code configured by the base station for UE 1 is (1, 1, 1, 1), and the spreading code configured by the base station for UE 2 is (1, −1, 1, −1). In UE 1 and UE 2, the same RVs and the corresponding spreading codes are orthogonal, or in UE 1 and UE 2, two same RVs and the corresponding spreading codes are orthogonal. Additionally, orthogonal spreading codes may be interchanged when configured for UE. For example, (1, −1, 1, −1) is configured for UE 1, and (1, 1, 1, 1) is configured for UE 2. The following is similar, and the details are not repeated here.

When the base station receives data, the base station may eliminate the interference caused by the overlapping resource of one UE and another UE through a corresponding spreading code. Thus, the coverage capability of UE is enhanced. The data received by the base station is the mixed data of UE 1 and UE 2, that is, the data received by the base station is (a0+b0)+(a0−b0)+(a0+b0)+(a0−b0). When the base station receives the data of UE 1, the data of UE 1 is multiplied by the spreading code sequence corresponding to UE 1 to obtain the actual transmission data of UE 1: (a0+b0)+(a0−b0)+(a0+b0)+(a0−b0)=4a0. When the base station receives the data of UE 2, the data of UE 2 is multiplied by the spreading code corresponding to UE 2 to obtain the actual transmission data of UE 2: (a0+b0)+(−a0+b0)+(a0+b0)+(−a0+b0)=4b0.

It is to be noted that this embodiment is illustrated by using an example in which two UE multiplex a resource, but this embodiment is not limited to two UE.

Further, the processing method of UE after receiving the data sent by the base station is similar to the preceding data processing method of the base station.

Specifically, when UE 1 and UE 2 receive data, UE 1 and UE 2 may eliminate the interference caused by the overlapping resource of one UE and another UE through a corresponding spreading code. Thus, the coverage capability of UE is enhanced. The data received by UE 1 and UE 2 are the mixed data processed by the base station. That is, the data received by UE 1 is (a0+b0)+(a0−b0)+(a0+b0)+(a0−b0). The data received by UE 1 is multiplied by the spreading code sequence corresponding to UE 1 to obtain the downlink data actually received by UE 1: (a0+b0)+(a0−b0)+(a0+b0)+(a0−b0)=4a0. The data received by UE 2 is (a0+b0)+(a0−b0)+(a0+b0)+(a0−b0). The data received by UE 2 is multiplied by the spreading code corresponding to UE 2 to obtain the downlink data actually received by UE 2: (a0+b0)+(−a0+b0)+(a0+b0)+(−a0+b0)=4b0.

Figure 5B:
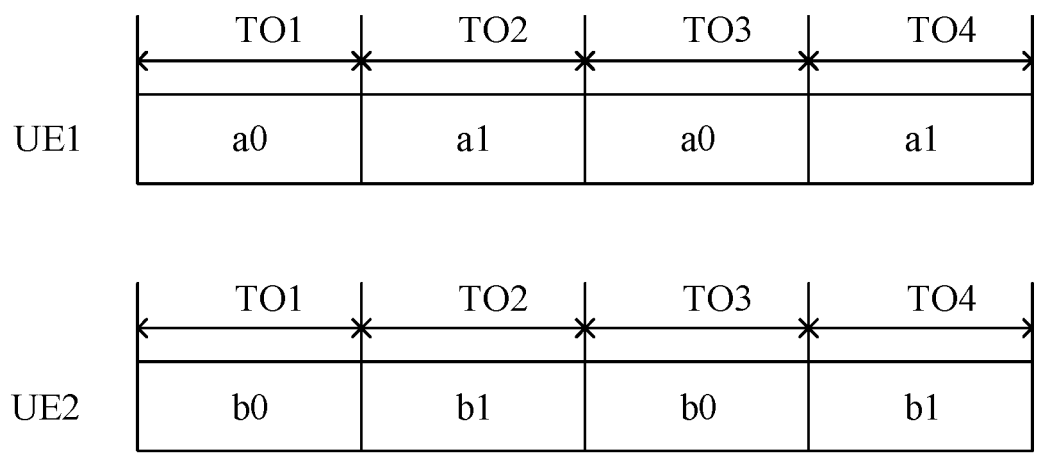
FIG. 5B is a diagram illustrating that PUSCH time-frequency resources of two user equipments overlap according to an embodiment of the present application.

For another example, FIG. 5B is a diagram illustrating that PUSCH time-frequency resources of two user equipments overlap according to an embodiment of the present application. As shown in FIG. 5B, in a neighborhood, UE 1 and UE 2 use the same time-frequency resource to perform PUSCH repeated transmissions, and both UE 1 and UE 2 perform PUSCH repeated transmissions 4 times. The RV sequence used in UE 1 and UE 2 is (0, 3, 0, 3). In UE 1, the data transmitted by RV0 is a0, and the data transmitted by RV3 is a1. In UE 2, the data transmitted by RV0 is b0, and the data transmitted by RV3 is b1. The spreading code configured by the base station for UE 1 is (1, 1, 1, 1), and the spreading code configured by the base station for UE 2 is (1, 1, −1, −1). The same RV and the spreading codes corresponding to different UE are orthogonal. The data received by the base station is the mixed data of UE 1 and UE 2, that is, the data received by the base station is (a0+b0)+(a1+b1)+(a0−b0)+(a1−b1). When the base station receives the data of UE 1, the data of UE 1 is multiplied by the spreading code sequence corresponding to UE 1 to obtain the actual transmission data of UE 1: (a0+b0)+(a1+b1)+(a0−b0)+(a1−b1)=2a0+2a1. When the base station receives the data of UE 2, the data of UE 2 is multiplied by the spreading code sequence corresponding to UE 2 to obtain the actual transmission data of UE 2: (a0+b0)+(a1+b1)−(a0−b0)−(a1−b1)=2b0+2b1.

It is to be noted that this embodiment is illustrated by using an example in which two UE multiplex a resource, but this embodiment is not limited to two UE.

It is to be noted that the processing method of UE after receiving the data sent by the base station is similar to the preceding data processing method of the base station. Specific reference may be made to the preceding data processing method of the base station, and details are not repeated in this embodiment.

Figure 5C:
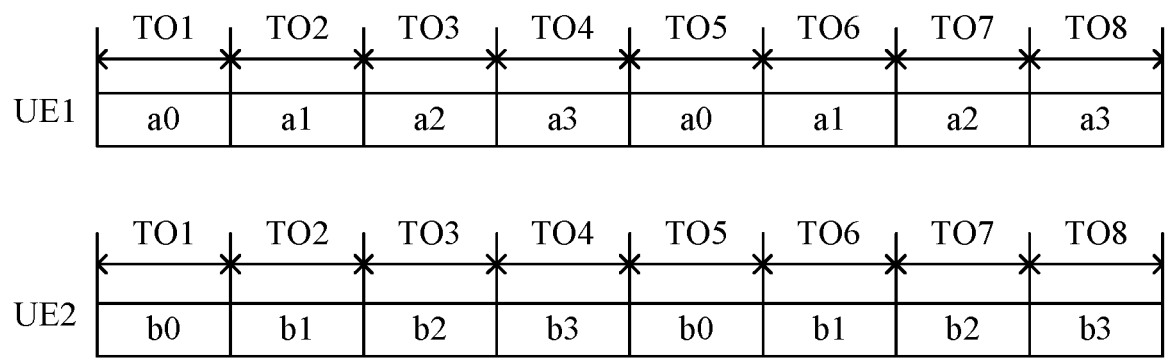
FIG. 5C is a diagram illustrating that PUSCH time-frequency resources of two user equipments overlap according to an embodiment of the present application.

For another example, FIG. 5C is a diagram illustrating that PUSCH time-frequency resources of two user equipments overlap according to an embodiment of the present application. As shown in FIG. 5C, in a neighborhood, UE 1 and UE 2 use the same time-frequency resource to perform PUSCH repeated transmissions, and both UE 1 and UE 2 perform PUSCH repeated transmissions 8 times. The RV sequence used in UE 1 and UE 2 is (0, 2, 3, 1). In UE 1, the data transmitted by RV0, RV2, RV3 and RV1 is a0, a1, a2 and a3 respectively. In UE 2, the data transmitted by RV0, RV2, RV3 and RV1 is b0, b1, b2 and b3 respectively. The spreading code configured by the base station for UE 1 is (1, 1, 1, 1, 1, 1, 1, 1), and the spreading code configured by the base station for UE 2 is (1, 1, 1, 1, −1, −1, −1, −1). The same RV and the spreading codes corresponding to different UE are orthogonal. That is, the data received by the base station is (a0+b0)+(a1+b1)+(a2+b2)+(a3+b3)+(a0−b0)+(a1−b1)+(a2−b2)+(a3−b3). When the base station receives the data of UE 1, the data of UE 1 is multiplied by the spreading code sequence corresponding to UE 1 to obtain the actual transmission data of UE 1: 2a0+2a1+2a2+2a3. When the base station receives the data of UE 2, the data of UE 2 is multiplied by the spreading code sequence corresponding to UE 2 to obtain the actual transmission data of UE 2: 2b0+2b1+2b2+2b3.

It is to be noted that this embodiment is illustrated by using an example in which two UE multiplex a resource, but this embodiment is not limited to two UE.

It is to be noted that the processing method of UE after receiving the data sent by the base station is similar to the preceding data processing method of the base station. Specific reference may be made to the preceding data processing method of the base station, and details are not repeated in this embodiment.

In an exemplary embodiment, to-be-processed data is processed based on a spreading code sequence in the following: If the actual number of transmissions corresponding to the same RV is not an even number, and the number of transmissions is an odd number, a corresponding grouping manner may be used for processing. An uplink is used as an example, both UE 1 and UE 2 perform repeated transmissions 5 times. The RV of the transmissions is (0, 3, 0, 3, 0). In UE 1, the data transmitted by RV0 is a0, and the data transmitted by RV3 is a1. In UE 2, the data transmitted by RV0 is b0, and the data transmitted by RV3 is b1. The spreading codes configured by the base station for UE 1 and UE 2 are (1, 1, 1, 1, 1) and (1, 1, −1, −1, 1) respectively. The data transmitted by UE 1 and UE 2 may be grouped. In group 1 of UE 1 and UE 2, the first 4 RVs, that is, (0, 3, 0, 3), are transmitted. Each of UE 1 and UE 2 intercepts corresponding first N spreading codes. Spreading codes intercepted by UE 1 and UE 2 and corresponding to the same RV in the RV sequence are orthogonal. The spreading codes intercepted by UE 1 and UE 2 are (1, 1, 1, 1) and (1, 1, −1, −1) respectively. In group 2, the last 4 RVs, that is, (3, 0, 3, 0), are transmitted. The corresponding spreading codes intercepted by UE 1 and UE 2 are (1, 1, 1, 1) and (1, 1, −1, −1) respectively. The same RVs and the spreading codes corresponding to different UE are orthogonal. If the same RVs and the spreading codes corresponding to different UE are not orthogonal, then corresponding spreading codes are cyclically intercepted in sequence until in UE, the same RVs and the corresponding spreading codes are orthogonal. The specific processing manner is similar to the preceding processing, and the details are not repeated here.

Further, in this embodiment, multiple manners in which the base station configures a spreading code sequence are also provided.

In manner one, a spreading code sequence and a TDRA table are jointly encoded.

A new column is added in the TDRA table to indicate spreading code information. For example, a column in the TDRA table may directly indicate a corresponding spreading code sequence. Table 1 is a TDRA table provided by this embodiment of the present application. As shown in Table 1, the first column is a row index, the second column is a PUSCH mapping type, the third column is K2, the fourth column is a start symbol S, the fifth column is a time domain length L, the sixth column is the number of repetitions, and the seventh column is a spreading code sequence. The seventh column is a newly added column in the TDRA table to directly indicate a spreading code sequence. It is to be noted that Table 1 is only part, not all of content of the TDRA table.

TABLE 1

| Row Index | PUSCH Mapping Type | K2 | Start Symbol S | Time Domain Length L | The Number of Repetitions | Spreading Code Sequence |
|---|---|---|---|---|---|---|
| 1 | B | 0 | 12 | 13 | 2 | (1, 1) |
| 2 | B | 0 | 1 | 3 | 4 | (1, −1, 1, −1) |
| ... | ... | ... | ... | ... | ... | ... |
| Up to 64 rows | B | ... | Indicated by 4 bits, ranging from 0 to [13] | Indicated by 4 bits, ranging from 1 to 14 | Value set {1, 2, [3], 4, [6], 7, [8], 12, 16} | Directly configuring spreading code sequence |

Table 2 is another TDRA table provided by this embodiment of the present application. As shown in Table 2, the first column is a row index, the second column is a PUSCH mapping type, the third column is K2, the fourth column is a start and length indicator value (SLIV), the fifth column is the number of repetitions, and the sixth column is a spreading code sequence. The sixth column is a newly added column in the TDRA table to directly indicate a spreading code sequence. It is to be noted that Table 2 is only part, not all of content of the TDRA table.

TABLE 2

| Row Index | PUSCH Mapping Type | K2 | Start and Length Indicator Value (SLIV) | The Number of Repetitions | Spreading Code Sequence |
|---|---|---|---|---|---|
| 1 | A/B | 0 | 26 | 2 | (1, 1) |
| 2 | A/B | 0 | 12 | 4 | (1, −1, 1, −1) |
| ... | ... | ... | ... | ... | ... |
| Up to 16 | A/B | ... | SLIV | Indicated by 3 bits, | Directly configuring |

TABLE 2-continued

| Row Index | PUSCH Mapping Type | K2 | Start and Length Indicator Value (SLIV) | The Number of Repetitions | Spreading Code Sequence |
|---|---|---|---|---|---|
| rows | | | | value set {1, 2, [3], 4, [6], 7, [8], 12, 16} | spreading code sequence |

For another example, the base station configures a spreading code sequence table for UE, and then a column in a TDRA table indicates the spreading code sequence corresponding to a row index of the corresponding TDRA table through N-byte (bit) information. N-bit information indicates an index of the spreading code sequence table. Table 3 is a spreading code sequence table provided by this embodiment of the present application. As shown in Table 3, the spreading code sequence table provided by this embodiment of the present application mainly includes two columns. The first column is a row index, and the second column is the spreading code sequence corresponding to a row index.

TABLE 3

| Row Index | Spreading Code Sequence |
|---|---|
| 1 | (1, 1, 1, 1) |
| 2 | (1, −1, 1, −1, 1) |
| ... | ... |
| $2^N$ | ... |

As shown in Table 4, the first column is a row index, the second column is a PUSCH mapping type, the third column is K2, the fourth column is a start symbol S, the fifth column is a time domain length L, the sixth column is the number of repetitions, and the seventh column is a spreading code sequence. In the seventh column, N bits are used to indicate a row index number in Table 3, and a total of the N-th power of 2 states may be indicated. The seventh column is a newly added column in the TDRA table to directly indicate a spreading code sequence. For example, the spreading code sequence corresponding to the row index number 1 in Table 4 is the spreading code sequence (1, 1, 1, 1) corresponding to the row index number 1 in Table 3. It is to be noted that Table 4 is only part, not all of content of the TDRA table.

TABLE 4

| Row Index | PUSCH Mapping Type | K2 | Start Symbol S | Time Domain Length L | The Number of Repetitions | Spreading Code Sequence |
|---|---|---|---|---|---|---|
| 1 | B | 0 | 12 | 13 | 2 | 1 |
| 2 | B | 0 | 1 | 3 | 4 | 3 |
| ... | ... | ... | ... | ... | ... | ... |
| Up to 64 rows | B | ... | Indicated by 4 bits, ranging from 0 to [13] | Indicated by 4 bits, ranging from 1 to 14 | Value set {1, 2, [3], 4, [6], 7, [8], 12, 16} | Indicated by N bits, a total of $2^N$ states, indicating a row index of Table 3 |

Table 5 is another TDRA table provided by this embodiment of the present application. As shown in Table 5, the first column is a row index, the second column is a PUSCH mapping type, the third column is K2, the fourth column is a start and length indicator value (SLIV), the fifth column is the number of repetitions, and the sixth column is a spreading code sequence. In the sixth column, N bits are used to indicate a row index number in Table 3, and a total of the N-th power of 2 states may be indicated. For example, the spreading code sequence corresponding to the row index number 1 in Table 5 is the spreading code sequence (1, 1, 1, 1) corresponding to the row index number 1 in Table 3. It is to be noted that Table 5 is only part, not all of content of the TDRA table.

TABLE 5

| Row Index | PUSCH Mapping Type | K2 | Start and Length Indicator Value (SLIV) | The Number of Repetitions | Spreading Code Sequence |
|---|---|---|---|---|---|
| 1 | A/B | 0 | 26 | 2 | 1 |
| 2 | A/B | 0 | 12 | 4 | 3 |
| ... | ... | ... | ... | ... | ... |
| Up to 16 rows | A/B | ... | SLIV | Indicated by 3 bits, value set {1, 2, [3], 4, [6], 7, [8], 12, 16} | Indicated by N bits, a total of $2^N$ states, indicating a row index of Table 3 |

In manner two, a new spreading code indication signaling is introduced to indicate a spreading code sequence, or the current signaling is multiplexed, and a new spreading code indicator domain is introduced into the current signaling to indicate a spreading code sequence. The specific indication manner of the new spreading code indication signaling is to directly indicate a spreading code sequence in a manner of an M-bit bitmap. Each bit of M bits can represent two elements of a spreading code. For example (E.g.), 1 in 1 bit represents the spreading code element "1", and 0 represents the spreading code element "−1". Similarly, the indication manner in which a new spreading code indication field is introduced into the current signaling is to directly indicate a spreading code sequence in a manner of an M-bit bitmap. Each bit of M bits can represent two elements of a spreading code. For example, 1 in 1 bit represents the spreading code element "1", and 0 represents the spreading code element "−1".

Further, the new spreading code indication signaling includes at least one of radio resource control (RRC), a medium access control-control element (MAC CE) or downlink control information (DCI).

Additionally, as shown in Table 3, the base station configures a spreading code sequence table. A corresponding bit domain in the new spreading code indication signaling or a new spreading code indication field introduced into the current signaling indicates a row index in the spreading code sequence table. The indication manner of a row index is similar to the manner provided in manner one in which row index numbers are indicated by a column of N bits in the TDRA table. Specific reference may be made to manner one, and details are not repeated in this embodiment.

Further, if the length of a configured spreading code sequence is greater than the number of transmission repetitions, the UE correspondingly intercepts the length of the spreading code sequence corresponding to the number of transmission repetitions and uses the spreading code sequence of this length as a corresponding spreading code sequence. For example, the number of repetitions configured for a row in a TDRA table is 4, and a spreading code sequence is configured as (1, 1, 1, 1, 1, 1). Then, the UE correspondingly intercepts a spreading code sequence of the length of 4, that is, the spreading code sequence in the corresponding square bracket of ([1, 1, 1, 1], 1, 1).

If the length of a configured spreading code sequence is less than the number of transmission repetitions, a polling extension is performed on the corresponding spreading code sequence, the UE correspondingly intercepts the length of a spreading code sequence obtained by the polling extension corresponding to the number of transmission repetitions and uses the spreading code sequence of this length as the corresponding spreading code sequence. For example, the number of repetitions configured for a row in a TDRA table is 6, and a spreading code sequence is configured as (1, 1, 1, 1). Then a polling extension is performed on the spreading code to compose a spreading code sequence (1, 1, 1, 1) (1, 1, 1, 1) having a length greater than the number of transmission repetitions, and the length of the spreading code sequence corresponding to the number of transmission repetitions is correspondingly intercepted and the spreading code sequence of this length is used as a corresponding spreading code sequence.

In an application embodiment, a processing method is provided in response to a subframe boundary or a U/D switching point occurring in a repeated transmission.

In the scenario where the outdoor base station covers the indoor user equipment having a high rate, the repeated transmission mechanism in the current R-16 or R-15 may be multiplexed so that the coverage enhancement is performed. In a neighborhood, after the time-frequency resources used by multiple UE overlap, to avoid that the interference caused by overlapping areas affects the coverage performance, in response to the occurrence of a subframe boundary or a U/D switching point during a repeated transmission, this nominal repeated transmission may be divided into two or more actual transmission occasions according to the current R-16 mechanism. Since a certain nominal repeated transmission resource is divided into multiple actual transmission occasions, the available resources of each TO of the multiple actual transmission occasions (TOs) become less, and the length of bytes that can be transmitted in the RV of an actual corresponding repeated transmission becomes less. In this case, since the byte lengths of actual transmissions are different, two same RVs cannot eliminate the interference in a manner of a spreading code. The present application provides the following manner to solve the problem that in response to the occurrence of a subframe boundary or a U/D switching point during a repeated transmission, since the byte lengths of actual transmissions are different, two same RVs cannot eliminate the interference in a manner of a spreading code.

In manner one, the actual transmission occasion of a PUSCH is implicitly indicated by whether a spreading code table is configured or whether a spreading code sequence is configured in a TDRA table. If a spreading code sequence is configured, when a subframe boundary or a U/D switching point is encountered, a corresponding nominal repeated transmission is not divided, and this nominal repeated transmission is delayed to the nearest available time-frequency resource for transmission. The delayed position is not allowed to exceed one preset time window. The time window may be determined according to a service delay. Accordingly, the spreading code sequence corresponding to this nominal repeated transmission is unchanged. If no spreading code sequence is configured, the transmission of a transmission mechanism is performed according to the mechanism of R-16. One nominal repeated transmission resource TO is divided into more than one actual transmission occasion (TO).

In manner two, a delay signaling is introduced and is used to clearly indicate whether this nominal repeated transmission TO is delayed and the resource position where the delay is performed.

In manner three, when one nominal repeated transmission resource TO is divided into more than one actual transmission occasion (TO), the RVs of corresponding actual transmission occasions (TOs) after the division are the same. The length of the bytes transmitted by the RV corresponding to each actual transmission occasion (TO) is the same, and the lengths of the bytes transmitted by RVs are the same. The length of the bytes transmitted by the corresponding RV carried by the shortest actual transmission occasion (TO) is used as reference. The spreading code sequence of a corresponding length is intercepted according to the number of corresponding actual transmission occasions (TOs). If the length of an indicated spreading code sequence is less than the number of actual transmission occasions (TOs), a polling extension is performed on the spreading code sequence.

Figure 5D:
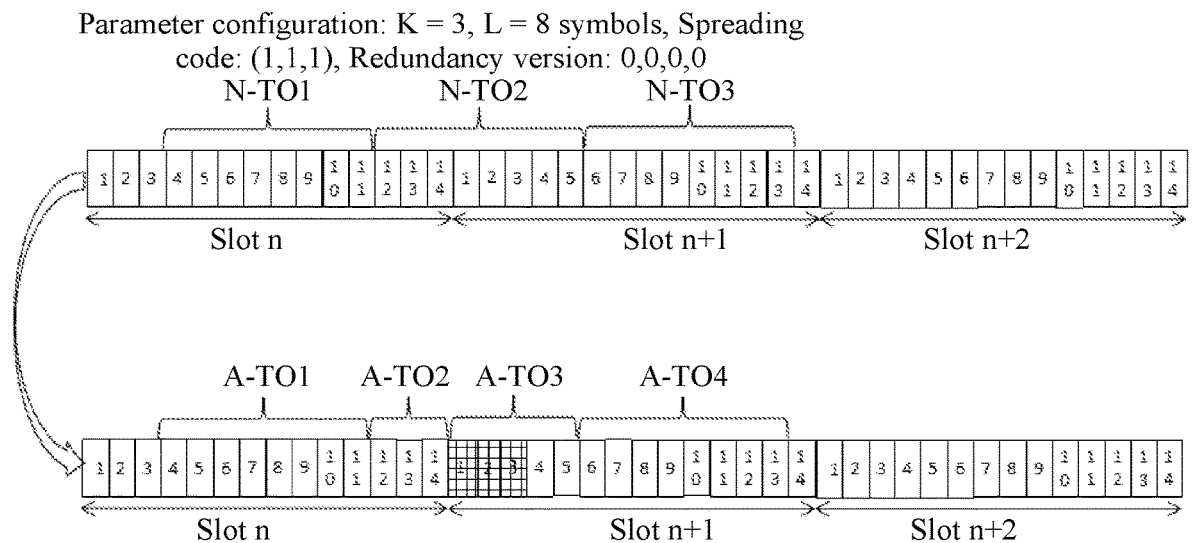
FIG. 5D is a diagram illustrating that a nominal repeated transmission is divided into multiple actual repeated transmissions according to an embodiment of the present application.

FIG. 5D is a diagram illustrating that a nominal repeated transmission is divided into multiple actual repeated transmissions according to an embodiment of the present application. As shown in FIG. 5D, the base station configures 3 times of repeated transmissions for UE1 and UE2, and the time-frequency resources used by the two UE overlap. Since the nominal repeated transmission 2 (N-TO2) encounters a slot boundary, that is, the boundary between the slot n and the slot n+1, this nominal repeated transmission (N-TO2) is divided into two actual repeated transmissions, that is, A-TO2 and A-TO3. The available resources in A-TO2 are not equal to the available resources in A-TO3. The length of the transmitted bits of the corresponding RV (RV=0) in A-TO3 is equal to the length of the transmitted bits of the corresponding RV (RV=0) in A-TO2. The spreading code sequence corresponding to A-TO1, A-TO2, A-TO3 and A-TO4 is (1, 1, 1, 1).

In an application embodiment, this embodiment of the present application embodiment provides a correspondence between a spreading code sequence and an RV sequence.

In the scenario where the outdoor base station covers the indoor user equipment having a high rate, the repeated transmission mechanism in the current R-16 or R-15 may be multiplexed so that the coverage enhancement is performed. In a neighborhood, multiple repeated transmissions are configured for multiple user equipments. Since the multiple repeated transmissions are affected by the size of a time-frequency resource or spectrum usage efficiency, time-frequency resources configured by different UE may overlap. To avoid that the interference caused by the overlap of time-frequency resources of different UE affects the coverage performance, in the related art, the first communication node configures a spreading code for different UE, and when some time-frequency resources overlap or all time-frequency resources overlap during the multiple repeated transmissions of multiple UE, the first communication node may use the configured spreading code sequence to correspondingly process received data. Thus, the interference caused by the first communication node due to the overlapping of time-frequency resources is eliminated, and the coverage capability is enhanced.

In a repeated transmission, there is a correspondence between an RV sequence and the length of a spreading code sequence. The length of an actually configured spreading code sequence is greater than or equal to twice the number of different elements in the RV sequence. For example, the RV sequence is configured as (0, 0, 0, 0), and the length of the corresponding configured spreading code cannot be less than 2. The RV sequence is configured as (0, 3, 0, 3), and the length of the corresponding configured spreading code sequence cannot be less than 4. The RV sequence is configured as (0, 2, 3, 1), and the length of the corresponding configured spreading code sequence cannot be less than 8.

Additionally, there is also a correspondence between the multiple identical elements in the RV sequence and the spreading code sequences corresponding to multiple different sending nodes. The same RVs and the spreading code sequences corresponding to multiple different sending nodes are orthogonal. The different sending nodes may be first sending nodes or second sending nodes. Further, the RV sequence is configured as (0, 3, 0, 3), the spreading code sequence configured for UE 1 is (1, 1, 1, 1), and the spreading code configured for UE 2 is (1, −1, 1, −1). For example, the elements in the spreading code sequence of UE 1 corresponding to the element 0 in the RV sequence are (1, 1), and the elements in the spreading code sequence of UE 2 corresponding to the element 0 in the RV sequence are (1, −1). The elements (1, 1) in the spreading code sequence of UE 1 and the elements (1, −1) in the spreading code sequence of UE 2 are orthogonal. For another example, the elements in the spreading code sequence of UE 1 corresponding to the element 3 in the RV sequence are (1, 1), and the elements in the spreading code sequence of UE 2 corresponding to the element 0 in the RV sequence are (1, −1). The elements (1, 1) in the spreading code sequence of UE 1 and the elements (1, −1) in the spreading code sequence of UE 2 are orthogonal.

Figure 6:
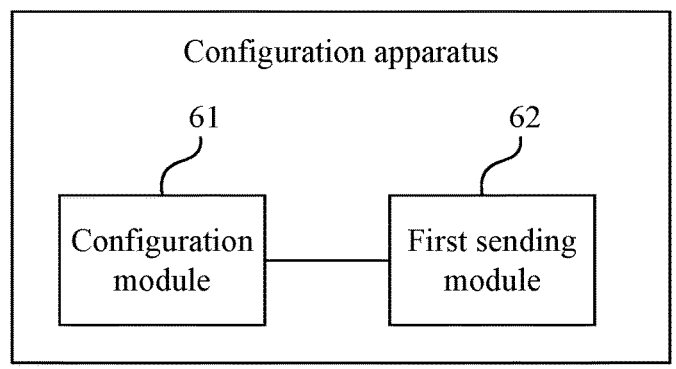
FIG. 6 is a diagram illustrating the structure of a configuration apparatus according to the present application.

FIG. 6 is a diagram illustrating the structure of a configuration apparatus according to the present application. This apparatus may be applied to the case where the base station configures a spreading code for the UE and indicates the spreading code to the UE. This configuration apparatus may be performed by software and/or hardware and integrated on the second communication node.

As shown in FIG. 6, the configuration apparatus provided by an embodiment of the present application mainly includes a configuration module 61 and a first sending module 62.

The configuration module 61 is configured to configure the corresponding spreading code sequence for each first communication node.

The first sending module 62 is configured to send the corresponding spreading code sequence to each first communication node. The spreading code sequence is configured to be used by the first communication node to process the first to-be-transmitted data or the received second data.

In an exemplary embodiment, the configuration module 61 is configured to jointly encode a spreading code sequence and a time domain resource allocation (TDRA) table.

In an exemplary embodiment, the configuration module 61 is configured to jointly encode a spreading code sequence and a time domain resource allocation (TDRA) table in one of the following manners: A corresponding spreading code sequence is configured in the TDRA table; or a spreading code sequence table is configured, index information is configured in the TDRA table, and the index information is configured to indicate a corresponding spreading code sequence in the spreading code sequence table.

In an exemplary embodiment, the configuration module 61 is configured to configure a corresponding spreading code sequence in one of the following manners: A new spreading code indication signaling is configured, and the new spreading code indication signaling indicates the corresponding spreading code sequence; a new spreading code indication field is configured in the current signaling, and the new spreading code indication field indicates the corresponding spreading code sequence; a spreading code sequence table and a corresponding spreading code indication signaling are configured, the corresponding spreading code indication signaling includes indication information, and the indication information is configured to indicate the corresponding spreading code sequence in the spreading code sequence table; or the spreading code sequence table is configured, a corresponding spreading code indication field in the current signaling is configured, the corresponding spreading code indication field includes indication information, and the indication information is configured to indicate the corresponding spreading code sequence in the spreading code sequence table.

In an exemplary embodiment, the configuration module 61 is configured to configure the correspondence between the length of the spreading code sequence and the number of different elements in a redundancy version (RV) sequence and the correspondence between spreading code sequences of different first communication nodes and a plurality of identical elements in the RV sequence.

In an exemplary embodiment, the configuration module 61 is configured to configure a delay signaling, and the delay signaling is configured to indicate the delay of a nominal repeated transmission and the start position of the delayed transmission resource in response to a subframe boundary or a U/D switching point occurring in a nominal repeated transmission resource of the first communication node.

In an exemplary embodiment, a spreading code sequence is also configured to instruct the first communication node to delay the position of the nominal repeated transmission to the nearest transmissible resource of the nominal repeated transmission. The position of the nearest transmissible resource is not allowed to exceed a pre-configured time window.

In an exemplary embodiment, the apparatus also includes a second processing module.

The second processing module is configured to process the second to-be-transmitted data based on the spreading code sequence to obtain the second data.

The first sending module 62 is configured to send the second data to the first communication node.

In an exemplary embodiment, the apparatus also includes a first receiving module.

The first receiving module is configured to receive the first data sent by the first communication node. The first data is obtained from the first to-be-transmitted data processed by the first communication node.

The second processing module is configured to process the first data based on the spreading code sequence process the first data based on the spreading code sequence a repeated transmission occurring between a plurality of first communication nodes.

In an exemplary embodiment, in response to the length of a spreading code sequence being greater than the number of transmission repetitions, first N bits of the spreading code sequence are intercepted and are used as a corresponding spreading code sequence. N denotes the number of transmission repetitions.

In an exemplary embodiment, in response to the length of a spreading code sequence being less than the number of transmission repetitions, a polling extension is performed on the spreading code sequence, and first N bits of a spreading code sequence obtained by the polling extension are intercepted and are used as the spreading code sequence. N denotes the number of transmission repetitions.

The configuration apparatus provided by this embodiment may execute the configuration method provided by any embodiment of the present application and has functional modules and beneficial effects corresponding to the method executed. For technical details not described in detail in this embodiment, reference may be made to the configuration method according to any embodiment of the present disclosure.

It is to be noted that units and modules involved in the embodiment of the preceding configuration apparatus are just divided according to functional logic, and the division is not limited to this, as long as the corresponding functions can be realized. In addition, the specific names of each functional unit are just intended for distinguishing, and are not to limit the protection scope of the present application.

Figure 7:
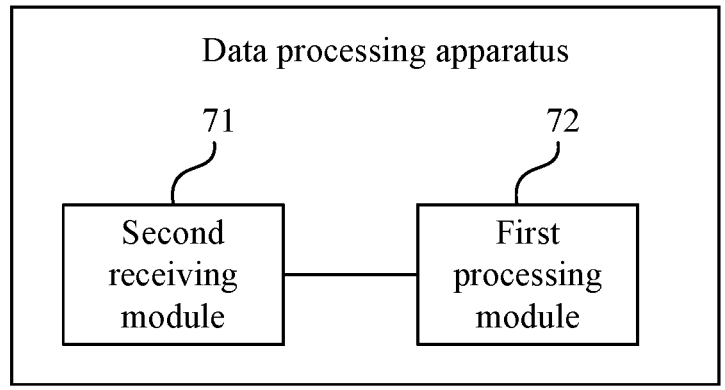
FIG. 7 is a diagram illustrating the structure of a data processing apparatus according to the present application.

FIG. 7 is a diagram illustrating the structure of a data processing apparatus according to the present application. This apparatus may be applied to the case where the UE performs data processing based on the spreading code configured by the base station. The data processing apparatus may be performed by software and/or hardware and integrated on the first communication node.

As shown in FIG. 7, the data processing apparatus provided an embodiment by the present application mainly includes a second receiving module 71 and a first processing module 72.

The second receiving module 71 is configured to receive the spreading code sequence sent by the second communication node and receive the second data sent by the second communication node. The spreading code sequence is configured and sent by the second communication node. The second data is obtained from second to-be-transmitted data processed by the second communication node.

The first processing module 72 is configured to process the first to-be-transmitted data or the received second data based on the spreading code sequence. The second data is obtained from second to-be-transmitted data processed by the second communication node.

In an exemplary embodiment, the spreading code sequence is configured by the second communication node in the following manner: The second communication node jointly encodes a spreading code sequence and a time domain resource allocation (TDRA) table.

In an exemplary embodiment, the second communication node jointly encodes a spreading code sequence and the time domain resource allocation (TDRA) table in one of the following manners: The second communication node configures a corresponding spreading code sequence in the TDRA table; or the second communication node configures a spreading code sequence table and configures index information in the TDRA table, and the index information is configured to indicate a corresponding spreading code sequence in the spreading code sequence table.

In an exemplary embodiment, the spreading code sequence is configured by the second communication node in one of the following manners: The second communication node configures the first spreading code indication signaling, and the first spreading code indication signaling includes the corresponding spreading code sequence; the second communication node configures the first spreading code indication field in the existing signaling, and the first spreading code indication field includes the corresponding spreading code sequence; the second communication node configures a corresponding spreading code sequence table and the corresponding second spreading code indication signaling, the second spreading code indication signaling includes indication information, and the indication information is used for indicating a spreading code sequence in the spreading code sequence table; or the second communication node configures the spreading code sequence table and configures the second spreading code indication field in the existing signaling, the second spreading code indication field includes indication information, and the indication information is configured to indicate the corresponding spreading code sequence in the spreading code sequence table.

In an exemplary embodiment, in response to the length of a spreading code sequence being greater than the number of transmission repetitions, first N bits of the spreading code sequence are intercepted and are used as a corresponding spreading code. N denotes the number of transmission repetitions.

In an exemplary embodiment, in response to the length of a spreading code sequence being less than the number of transmission repetitions, a polling extension is performed on the spreading code sequence, and first N bits of a spreading code sequence obtained by the polling extension are intercepted and are used as the corresponding spreading code sequence. N denotes the number of transmission repetitions.

In an exemplary embodiment, the second receiving module 71 is configured to receive a delay signaling, and the delay signaling is configured to indicate the delay of a nominal repeated transmission and the start position of the delayed transmission resource process the first data based on the spreading code sequence a subframe boundary or a U/D switching point occurring in a nominal repeated transmission resource of the first communication node.

In an exemplary embodiment, a spreading code sequence is also configured to indicate that the position of the nominal repeated transmission is delayed to the nearest transmissible resource of the nominal repeated transmission process the first data based on the spreading code sequence the subframe boundary or the U/D switching point occurring in the nominal repeated transmission resource. The position of the nearest transmissible resource is not allowed to exceed the pre-configured time window.

In an exemplary embodiment, the apparatus also includes a division module. The division module is configured to divide this nominal repeated transmission resource into a plurality of actual transmission occasions in response to the subframe boundary or the U/D switching point occurring in the nominal repeated transmission resource. The RV corresponding to each actual repeated transmission occasion is the RV corresponding to the nominal repeated transmission resource. Byte lengths carried by RVs respectively corresponding to plurality of actual repeated transmission occasions are the same. The byte length carried by an RV is the byte length carried by the RV corresponding to the shortest actual transmission occasion.

The data processing apparatus provided by this embodiment may execute the data processing method provided by any embodiment of the present application and has functional modules and beneficial effects corresponding to the method executed. For technical details not described in detail in this embodiment, reference may be made to the data processing method according to any embodiment of the present disclosure.

It is to be noted that units and modules involved in the embodiment of the preceding data processing apparatus are just divided according to functional logic, and the division is not limited to this, as long as the corresponding functions can be realized. In addition, the specific names of each functional unit are just intended for distinguishing, and are not to limit the protection scope of the present application.

Figure 8:
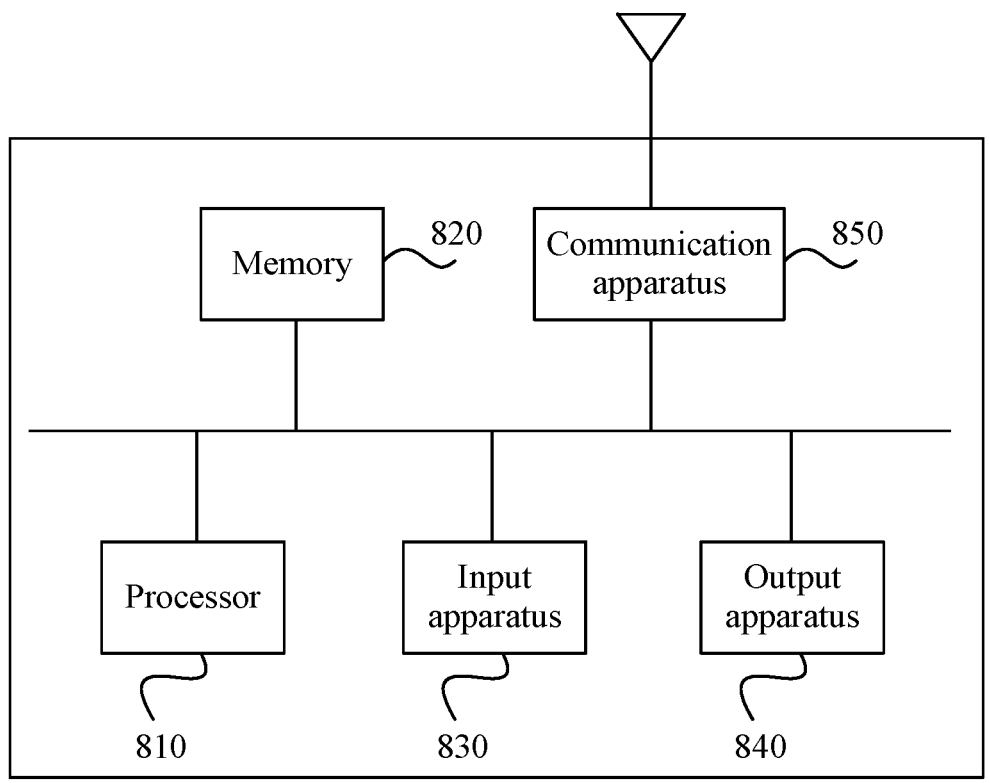
FIG. 8 is a diagram illustrating the structure of a device according to an embodiment of the present application.

FIG. 8 is a diagram illustrating the structure of a device according to an embodiment of the present application. As shown in FIG. 8, the device includes a processor 810, a memory 820, an input apparatus 830 and an output apparatus 840. At least one processor 810 may be disposed in the device, and one processor 810 is used as an example in FIG. 8. The processor 810, the memory 820, the input apparatus 830 and the output apparatus 13 in the device may be connected by a bus or other modes. Connecting by a bus is used as an example in FIG. 8.

As a computer-readable storage medium, the memory 820 may be configured to store software programs and computer-executable programs and modules, such as program instructions/modules (for example, the configuration module 61 and the first sending module 62 in the configuration apparatus) corresponding to the configuration method according to the embodiments of the present application, or such as program instructions/modules (for example, the second receiving module 71 and the first processing module 72 in the data processing apparatus) corresponding to the data processing method according to the embodiments of the present application. The processor 810 runs the software programs, instructions and modules stored in the memory 820 to execute function applications and data processing of the device, that is, to perform any method provided by the embodiments of the present application.

The memory 820 may mainly include a program storage region and a data storage region, where the program storage region may store an operating system and an application program required by at least one function while the data storage region may store data created depending on the use of a device. Additionally, the memory 820 may include a high-speed random access memory and may also include a non-volatile memory, for example, at least one magnetic disk memory and flash memory or other non-volatile solid-state memories. In some examples, the memory 820 may also include memories located remotely relative to the processor 810, and these remote memories may be connected to the device via a network. Examples of the preceding network include, but are not limited to, the Internet, an intranet, a local area network, a mobile communication network and a combination thereof.

The input apparatus 830 may be used for receiving inputted digital or character information and for generating soft key signal input related to user settings and function control of the device. The output apparatus 840 may include a display device, for example, a display screen.

A communication apparatus 850 may include a receiver and a sender. The communication apparatus 850 is configured to perform information transceiving and communication under the control of the processor 810.

It is to be noted that when the execution device in this embodiment is the second communication node, the processor 810 runs the programs stored in the memory 820 to execute function applications and data processing. For example, the configuration method provided by the embodiments of the present application is performed. The method includes the following: A corresponding spreading code sequence is configured for each first communication node; and the corresponding spreading code sequence is sent to each first communication node, and the spreading code sequence is configured to be used by the first communication node to process the first to-be-transmitted data or the received second data.

It is to be understood by those skilled in the art that the processor 810 may also perform the technical solution of the configuration method provided by any embodiment of the present application. For the hardware structure and function of the device, reference may be made to the content description of this embodiment.

It is to be noted that when the execution device in this embodiment is the first communication node, the processor 810 runs the programs stored in the memory 820 to execute function applications and data processing. For example, the data processing method provided by the embodiments of the present application is performed. The method includes the following: The spreading code sequence sent by the second communication node is received, and the spreading code sequence is configured and sent by the second communication node; and the first to-be-transmitted data or the received second data are processed based on the spreading code sequence, and the second data is obtained from second to-be-transmitted data processed by the second communication node.

It is to be understood by those skilled in the art that the processor 810 may also perform the technical solution of the data processing method provided by any embodiment of the present application. For the hardware structure and function of the device, reference may be made to the content description of this embodiment.

An embodiment of the present application also provides a storage medium including computer-executable instructions, and the computer-executable instructions are used to execute a configuration method when executed by a computer processor. The method includes the following: A corresponding spreading code sequence is configured for each first communication node; and the corresponding spreading code sequence is sent to each first communication node, and the spreading code sequence is configured to be used by the first communication node to process the first to-be-transmitted data or the received second data.

In the storage medium including computer-executable instructions provided by this embodiment of the present application, the computer-executable instructions may execute not only the preceding method operations but also related operations in the configuration method provided by any embodiment of the present application.

An embodiment of the present application also provides a storage medium including computer-executable instructions, and the computer-executable instructions are used to execute a data processing method when executed by a computer processor. The method includes the following: the spreading code sequence sent by the second communication node is received, and the spreading code sequence is configured and sent by the second communication node; and the first to-be-transmitted data or the received second data are processed based on the spreading code sequence, and the second data is obtained from second to-be-transmitted data processed by the second communication node.

In the storage medium including computer-executable instructions provided by this embodiment of the present application, the computer-executable instructions may execute not only the preceding method operations but also related operations in the data processing method provided by any embodiment of the present application.

From the preceding description of embodiments, it is to be understood by those skilled in the art that the present application may be implemented by software and necessary general-purpose hardware or may be implemented by hardware. Based on this understanding, the technical solutions of the present application may be embodied in the form of a software product. The software product in a computer may be stored in a computer-readable storage medium such as a floppy disk, read-only memory (ROM), random-access memory (RAM), flash memory, hard disk or optical disk in the computer and includes multiple instructions for enabling a computer device (which may be a personal computer, a server or a network device) to execute the method in each embodiment of the present application.

The preceding are only exemplary embodiments of the present application and are not intended to limit the scope of the present application.

It is to be understood by those skilled in the art that the term "user terminal" covers any suitable type of wireless second communication node, for example, a mobile phone, a portable data processing apparatus, a portable web browser or a vehicle-mounted mobile station.

In general, multiple embodiments of the present application may be implemented in hardware, a dedicated circuit, software, logic or any combination thereof. For example, some aspects may be implemented in hardware while other aspects may be implemented in firmware or software that may be performed by a controller, a microprocessor or other computing apparatuses, though the present application is not limited thereto.

The embodiments of the present application may be implemented by computer program instructions executed by a data processor of a mobile apparatus, for example, in a processor entity, by hardware or by a combination of software and hardware. The computer program instructions may be assembly instructions, instruction set architecture (ISA) instructions, machine instructions, machine-related instructions, microcodes, firmware instructions, status setting data, or source or object codes written in any combination of at least one programming language.

A block diagram of any logic flow among the drawings of the present application may represent program procedures, may represent interconnected logic circuits, modules and functions, or may represent a combination of program procedures with logic circuits, modules and functions. Computer programs may be stored in a memory. The memory may be in any type suitable for the local technical environment and may be implemented using any suitable data storage technology, for example, but not limited to, a read-only memory (ROM), a random-access memory (RAM), and an optical memory apparatus and system [a digital video disc (DVD) or a compact disc (CD)]. Computer-readable media may include a non-transitory storage medium. The data processor may be of any type suitable for the local technical environment, such as, but not limited to, a general-purpose computer, a special-purpose computer, a microprocessor, a digital signal processor (DSP), an application specific integrated circuit (ASIC), a field-programmable gate array (FPGA) and a processor based on a multi-core processor architecture.

What is claimed is:

1. A configuration method, applied to a second communication node and comprising:
   configuring a corresponding spreading code sequence for each first communication node; and
   sending the spreading code sequence to the each first communication node, wherein the spreading code sequence is configured to be used by the each first communication node to process first to-be-transmitted data or received second data;
   wherein configuring the corresponding spreading code sequence comprises one of the following:
   jointly encoding the spreading code sequence and a time domain resource allocation (TDRA) table;
   configuring a new spreading code indication signaling, wherein the new spreading code indication signaling indicates the corresponding spreading code sequence;
   configuring a new spreading code indication field in a current signaling, wherein the new spreading code indication field indicates the corresponding spreading code sequence;
   configuring a spreading code sequence table and a corresponding spreading code indication signaling, wherein the corresponding spreading code indication signaling comprises indication information configured to indicate the corresponding spreading code sequence in the spreading code sequence table; or
   configuring the spreading sequence table and configuring a corresponding spreading code indication field in a current signaling, wherein the corresponding spreading code indication field comprises indication information configured to indicate the corresponding spreading code sequence in the spreading code sequence table.

2. The method according to claim 1, wherein jointly encoding the spreading code sequence and the TDRA table comprises one of the following:
   configuring the corresponding spreading code sequence in the TDRA table; or
   configuring a spreading code sequence table and configuring index information in the TDRA table, wherein the index information is configured to indicate the corresponding spreading code sequence in the spreading code sequence table.

3. The method according to claim 1, further comprising:
   configuring a correspondence between a length of the spreading code sequence and a number of different elements in a redundancy version (RV) sequence; and
   configuring a correspondence between spreading code sequences of different first communication nodes and a plurality of identical elements in the RV sequence.

4. The method according to claim 1, further comprising:
   configuring a delay signaling, wherein the delay signaling is configured to indicate a delay of a nominal repeated transmission and a start position of a delayed transmission resource in response to a subframe boundary or an uplink-downlink (U/D) switching point occurring in a nominal repeated transmission resource of the first communication node.

5. The method according to claim 1, wherein the spreading code sequence is further configured to instruct the first communication node to delay a position of a nominal repeated transmission to a nearest transmissible resource of the nominal repeated transmission in response to a subframe boundary or a U/D switching point occurring in a nominal repeated transmission resource of the first communication node, wherein a position of the nearest transmissible resource is not allowed to exceed a pre-configured time window.

6. The method according to claim 1, further comprising:
   processing second to-be-transmitted data based on the spreading code sequence to obtain the second data; and
   sending the second data to the first communication node.

7. The method according to claim 1, further comprising:
   receiving first data sent by the first communication node, wherein the first data is obtained from the first to-be-transmitted data processed by the first communication node; and in response to a repeated transmission occurring between a plurality of first communication nodes, processing the first data based on the spreading code sequence.

8. The method according to claim 6, wherein in response to a length of the spreading code sequence being greater than a number of transmission repetitions, first N bits of the spreading code sequence are intercepted and are used as the spreading code sequence, wherein N denotes the number of transmission repetitions; or in response to a length of the spreading code sequence being less than a number of transmission repetitions, a polling extension is performed on the spreading code sequence, and first N bits of a spreading code sequence obtained by the polling extension are intercepted and are used as the spreading code sequence, wherein N denotes the number of transmission repetitions.

9. A data processing method, applied to a first communication node and comprising:

receiving a spreading code sequence sent by a second communication node, wherein the spreading code sequence is configured and sent by the second communication node; and processing first to-be-transmitted data or received second data based on the spreading code sequence, wherein the received second data is obtained by processing second to-be-transmitted data by the second communication node;

wherein the spreading code sequence is configured by the second communication node in one of the following manners:

the second communication node jointly encodes the spreading code sequence and a time domain resource allocation (TDRA) table;

the second communication node configures a first spreading code indication signaling, wherein the first spreading code indication signaling comprises the spreading code sequence;

the second communication node configures a first spreading code indication field in an existing signaling, wherein the first spreading code indication field comprises the spreading code sequence;

the second communication node configures a corresponding spreading code sequence table and a corresponding second spreading code indication signaling, wherein the second spreading code indication signaling comprises indication information configured to indicate the spreading code sequence in the spreading code sequence table; or the second communication node configures a spreading code sequence table and configures a second spreading code indication field in an existing signaling, wherein the second spreading code indication field comprises indication information configured to indicate the spreading code sequence in the spreading code sequence table.

10. The method according to claim 9, wherein the second communication node jointly encodes the spreading code sequence and the TDRA table in one of the following manners:

the second communication node configures the spreading code sequence in the TDRA table; or the second communication node configures a spreading code sequence table and configures index information in the TDRA table, and the index information is configured to indicate the spreading code sequence in the spreading code sequence table.

11. The method according to claim 9, wherein in response to a length of the spreading code sequence being greater than a number of transmission repetitions, first N bits of the spreading code sequence are intercepted and are used as the spreading code sequence, wherein N denotes the number of transmission repetitions; or in response to a length of the spreading code sequence being less than a number of transmission repetitions, a polling extension is performed on the spreading code sequence, and first N bits of a spreading code sequence obtained by the polling extension are intercepted and are used as the spreading code sequence, wherein N denotes the number of transmission repetitions.

12. The method according to claim 9, further comprising:

receiving a delay signaling, wherein the delay signaling is configured to indicate a delay of a nominal repeated transmission received by the first communication node and a start position of a delayed transmission resource received by the first communication node.

13. The method according to claim 9, wherein the spreading code sequence is further configured to indicate a delayed position of a nominal repeated transmission received by the first communication node, wherein the delayed position is a nearest transmissible resource of the nominal repeated transmission, and a position of the nearest transmissible resource is not allowed to exceed a pre-configured time window.

14. The method according to claim 9, further comprising:

in response to a subframe boundary or an uplink-downlink (U/D) switching point occurring in a nominal repeated transmission resource, dividing the nominal repeated transmission resource into a plurality of actual transmission occasions, wherein an respective RV corresponding to each actual transmission occasion of the plurality of actual transmission occasions is an RV corresponding to the nominal repeated transmission resource, byte lengths carried by RVs respectively corresponding to plurality of actual transmission occasions are the same, and a byte length carried by an RV of the RVs is a byte length carried by an RV corresponding to a shortest actual transmission occasion.

15. A device, comprising
at least one processor; and
a memory configured to store at least one program, wherein when executed by the at least one processor, the at least one program causes the at least one processor to perform the method according to claim 1.

16. A non-transitory storage medium storing a computer program which, when executed by a processor, causes the processor to perform the method according to claim 1.

* * * * *